(12) United States Patent
Meister et al.

(10) Patent No.: US 10,775,561 B2
(45) Date of Patent: Sep. 15, 2020

(54) OPTOELECTRONIC COMPONENT

(71) Applicant: Technische Universität Berlin, Berlin (DE)

(72) Inventors: Stefan Meister, Berlin (DE); Hanjo Rhee, Berlin (DE); Christoph Theiss, Berlin (DE); Sebastian Kupijai, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 583 days.

(21) Appl. No.: 15/515,923

(22) PCT Filed: Sep. 28, 2015

(86) PCT No.: PCT/DE2015/200464
§ 371 (c)(1),
(2) Date: Mar. 30, 2017

(87) PCT Pub. No.: WO2016/050243
PCT Pub. Date: Apr. 7, 2016

(65) Prior Publication Data
US 2019/0146151 A1    May 16, 2019

(30) Foreign Application Priority Data

Sep. 30, 2014  (DE) .................. 10 2014 219 792

(51) Int. Cl.
*G02B 6/42*   (2006.01)
*G02B 6/12*   (2006.01)
(Continued)

(52) U.S. Cl.
CPC .......... *G02B 6/12004* (2013.01); *G02B 6/30* (2013.01); *G02B 6/428* (2013.01); *G02B 6/4214* (2013.01);
(Continued)

(58) Field of Classification Search
CPC .. G02B 6/12004; G02B 6/428; G02B 6/4214; G02B 6/4274
See application file for complete search history.

(56) References Cited

U.S. PATENT DOCUMENTS 8,213,751 B1 * 7/2012 Ho ........................... G02B 6/43
385/1
8,772,704 B2   7/2014 Mack et al.
(Continued)

FOREIGN PATENT DOCUMENTS

CN    103312415 A    9/2013
CN    103580751 A    2/2014
(Continued)

OTHER PUBLICATIONS

D. Knoll et al.; "Monolithically Integrated 25Gbit/sec Receiver for 1.66um in Photonic BiCMOS Technology"; Optical Society of America; OFC 2014; OSA 2014; (3 pages).
(Continued)

*Primary Examiner* — Sung H Pak
*Assistant Examiner* — Hoang Q Tran
(74) *Attorney, Agent, or Firm* — Gordon Rees Scully Mansukhani, LLP

(57) ABSTRACT

An optoelectronic component includes a chip having a substrate and at least one optical waveguide integrated in the chip. The electro-optical component may be monolithically integrated in one or a plurality of semiconductor layers of the chip arranged on the substrate top side of the substrate, or on the substrate top side of the substrate. At least one electrical connection of the monolithically integrated electro-optical component is connected by means of a connection line to a conductor track connection situated below the substrate rear side. The connection line extends through a hole in the substrate from the electro-optical component to
(Continued)

the conductor track connection situated below the substrate rear side.

13 Claims, 17 Drawing Sheets

(51) Int. Cl.
    *G02B 6/30*     (2006.01)
    *G02B 6/43*     (2006.01)

(52) U.S. Cl.
    CPC ............. *G02B 6/4274* (2013.01); *G02B 6/43* (2013.01); *G02B 2006/12107* (2013.01)

(56) References Cited

U.S. PATENT DOCUMENTS

| | | |
|---|---|---|
| 8,831,437 B2 | 9/2014 | De Dobbelaere et al. |
| 9,057,450 B2* | 6/2015 | Shurina .................... F16K 29/00 |
| 9,057,844 B2* | 6/2015 | Doany ...................... G02B 6/34 |
| 2012/0177381 A1 | 7/2012 | De Dobbelaere et al. |
| 2012/0226118 A1 | 9/2012 | Delbeke et al. |
| 2012/0280344 A1 | 11/2012 | Shastri et al. |
| 2012/0301149 A1 | 11/2012 | Pinguet et al. |
| 2013/0156364 A1 | 6/2013 | Chen et al. |
| 2014/0203175 A1* | 7/2014 | Kobrinsky ............. G02B 6/428 250/214.1 |
| 2014/0264400 A1 | 9/2014 | Lipson et al. |
| 2014/0270629 A1* | 9/2014 | Dutt ......................... G02B 6/43 385/14 |
| 2015/0037044 A1* | 2/2015 | Peterson .............. G02B 6/4292 398/135 |
| 2016/0109731 A1* | 4/2016 | Huang .................... G02F 1/015 385/3 |

FOREIGN PATENT DOCUMENTS

| | | |
|---|---|---|
| EP | 2 639 978 A1 | 9/2013 |
| EP | 2 696 229 A2 | 2/2014 |
| WO | WO 2016/050242 A1 | 4/2016 |

OTHER PUBLICATIONS

Chinese Office Action and Search Report dated Dec. 20, 2018 issued in related Chinese Application No. 201580049634.9; filed Sep. 28, 2015.

European Office Action dated Jan. 4, 2019 issued in related European Patent Application No. 15 812 943.7.

International Search Report for Application No. PCT/DE2015/200464 dated Mar. 14, 2016.

J.M. Fedeli et al., "Electronic-Photonic Integration in the Helios Project", 10th International Conference on Group IV Photonics, IEEE, Aug. 28, 2013, pp. 146-147, XP032513505, ISSN: 1949-2081, DOI: 10.1109/GROUP4.2013.6644413.

M M V Taklo et al., "Strong, high-yield and low-temperature thermocompression silicon wafer-level bonding with gold", Institute of Physics Publishing—Journal of Micromechanics and Microengineering, Published on May 13, 2004; J. Micromech. Microeng, vol. 14, No. 7, pp. 884-890.

M. Moehrle et al., "1490 nm Surface Emitting DFB Laser Diodes Operated by VCSEL Driver ICs", Fraunhofer Institute for Telecommunications, Heinrich-Hertz-Institut, Berlin, Germany, OECD, 2012.

R. Krishnamurthy, "The Luxtera CMOS Integrated Photonic Chip in a Molex Cable", Chipworks, http://vww.chipworks.com/en/technical-competitive-analysis/resources/blog/the-luxtera-cmos-integrated-photonic-chip-in-a-molex-cable/.

Makoto Motoyoshi, Member IEEE, Through-Silicon Via (TSV), Proceedings of the IEEE, vol. 97, No. 1, Jan. 2009, pp. 43-48.

Fuad E. Doany et al., "Terabit/s-class 24-channel bidirectional optical transceiver module based on TSV Si carrier for board-level interconnects", Electronic Components and Technology Conference, Piscataway, New Jersey, 2010 IEEE, pp. 58-65.

Dr. H. Schröder, "Anforderungen und Lösungen zur hochpräzisen optoelektronischen und mikrooptischen Montage auf Baugruppenträgern," Cooperative Computing & Communication Laboratory, C-LAB Report, vol. 9 (2010), No. 06, C-LAB-TR-2010-06, Tutorial SMT Hybrid Packaging 2010, pp. 1-42.

* cited by examiner

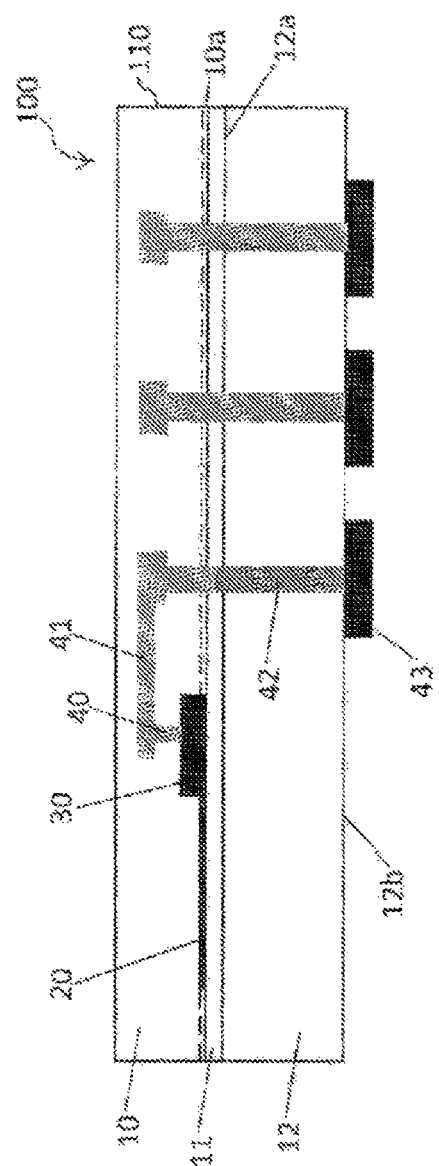

OPTOELECTRONIC COMPONENT

The invention relates to optoelectronic components which comprise a chip comprising a substrate and at least one optical waveguide integrated in the chip.

Optical transceivers, this being the term used by those skilled in the art, obtainable nowadays serve as transmitters and receivers for converting electrical data signals into electrical signals, and vice versa. The main difficulty is that an integrated assembly, referred to as "package" by those skilled in the art, for an optical transceiver firstly has to provide the photonic integrated circuits, consisting of waveguides, optically active components and optically passive components, such as modulators, photodiodes, splitters and light couplers. Secondly, electronic components such as modulator driver, transimpedance amplifier (TIA), limiting amplifier (LA), this being the term used by those skilled in the art, clock and data recovery (CDR), this being the term used by those skilled in the art, and equalizer, this being the term used by those skilled in the art, are necessary, for which highly developed connection techniques from microelectronics already exist. The intention is to accommodate this multiplicity of different components in a common form factor as compactly as possible and in a manner that saves as much energy as possible, in conjunction with low electrical and optical losses and using cost-effective construction technology. At the same time, an efficient scalability toward higher transmission rates and quantities must be part of the overall concept.

As is known, the individual chips of the transceiver can be applied and electrically contacted by wire bonding, this being the term used by those skilled in the art, or by installation upside down without bonding wires, referred to as "flip chip" by those skilled in the art, on a wiring substrate, referred to as "interposer" by those skilled in the art, which consists e.g. of silicon, ceramic or a polymer, or directly on a substrate that usually consists of a printed circuit board (PCB). In this context there are variants in which the optical fibers are led through an opening in the wiring substrate or substrate to the optical chip [1, 2] or from above into a region that is free of electrical contact pads. Solutions are likewise being developed in which optical signals are coupled into a wiring substrate [3], or in some concepts into a substrate [1], are guided there and are coupled out again therefrom. The considerable disadvantage here is the long signal paths with corresponding damping losses and coupling losses at each transition. These additional losses by themselves may have the consequence that the end-to-end power budget for the entire transmission link leaves no more margin for the losses that can occur in the actual transmission medium, generally an optical fiber.

Present-day commercial optical transceivers, usually based on signal transmission in multimode fibers, comprise diverse discrete optical components for beam deflection and shaping, such as microlenses, microprisms, beam splitters and deflection mirrors. These components have to be positioned and fixed on a carrier by machine, which obstructs simple scalability.

Proceeding from the prior art described, the invention is based on the object of specifying an optoelectronic component which has a simple and cost-effective overall construction.

This object is achieved according to the invention by means of an optoelectronic component having the features as claimed in patent claim 1. Advantageous configurations of the optoelectronic component according to the invention are specified in dependent claims.

Accordingly, it is provided according to the invention that an electro-optical component is monolithically integrated in one or a plurality of semiconductor layers of the chip arranged on the substrate top side of the substrate, or on the substrate top side of the substrate and at least one electrical connection of the monolithically integrated electro-optical component is connected by means of a connection line to a conductor track connection situated below the substrate rear side, wherein the connection line extends through a through hole in the substrate from the electro-optical component to the conductor track connection situated below the substrate rear side.

A major advantage of the component according to the invention or of the component construction according to the invention is that a separation between the optical connection side and the electrical connection side is achievable. In this regard, by way of example, the optical connection side can be arranged on the chip top side of the chip and the electrical connection side can be arranged on the chip underside of the chip.

It is thus particularly advantageous if at least one of the optical connections, preferably all of the optical connections, are arranged on the chip top side of the chip and at least one of the electrical connections, preferably all of the electrical connections, are arranged on the chip underside of the chip.

The monolithically integrated electro-optical component is preferably a photodetector or a modulator.

Preferably, the integrated waveguide is equipped with or connected to a deflection device which deflects optical radiation to be coupled out from the waveguide virtually perpendicularly in the direction of the chip top side, or deflects radiation incident virtually perpendicularly from the chip top side and couples it into the waveguide.

The deflection device is preferably formed by a grating coupler embodied in the waveguide.

SOI (Silicon-On-Insulator) material is preferably used as chip base material. Accordingly, it is considered to be advantageous if a silicon dioxide layer is situated on the substrate and a silicon cover layer is situated above said silicon dioxide layer, and the optical waveguide and the electro-optical component are integrated in the silicon cover layer.

Moreover, it is advantageous if an electrical component is monolithically integrated in one or a plurality of semiconductor layers of the chip arranged on the substrate top side of the substrate or on the substrate top side of the substrate and at least one electrical connection of the monolithically integrated electrical component is connected by means of a connection line to a conductor track connection situated below the substrate rear side.

The monolithically integrated electrical component is preferably an amplifier or a driver.

In one particularly preferred configuration of the optoelectronic component it is provided that the at least one integrated waveguide or at least one of the integrated waveguides in the region of one of its waveguide ends is equipped with or connected to a deflection device by which optical radiation that comes from a light source arranged on the chip top side of the chip and is incident virtually perpendicularly to the chip top side is coupled into the waveguide, and in the region of the other waveguide end is equipped with or connected to a deflection device which deflects optical radiation to be coupled out from the waveguide virtually perpendicularly in the direction of the chip top side, in particular in the direction of an optical fiber arranged on the chip top side or in the direction of a light deflection element arranged on the chip top side. At least one electrical connection of the light source is preferably connected by means of a connection line to a conductor track connection situated below the substrate rear side. The deflection devices arranged in the region of the waveguide ends are preferably Bragg gratings that are introduced in the waveguide.

Preferably, a modulator is monolithically integrated between the two waveguide ends in the chip, said modulator modulating the radiation of the light source before coupling into the optical fiber.

Moreover, it is advantageous if the at least one integrated waveguide or at least one of the integrated waveguides in the region of one of its waveguide ends is equipped with or connected to a deflection device by which optical radiation that comes from an optical fiber arranged on the chip top side and is incident virtually perpendicularly to the chip top side is coupled into the waveguide, and in the region of the other waveguide end is connected to a photodetector monolithically integrated in the chip. The deflection device arranged in the region of the waveguide end is preferably a Bragg grating that is introduced in the waveguide.

Preferably, in addition a transimpedance amplifier is monolithically integrated in the chip, said transimpedance amplifier amplifying the electrical signal of the photodetector.

Moreover, it is advantageous if the chip is placed by its underside on a printed circuit board that forms a wiring plane for the electrical conductor track connection situated on the chip rear side.

In a further advantageous configuration of the optoelectronic component it is provided that an electrical component is monolithically integrated in one or a plurality of semiconductor layers of the chip arranged on the substrate top side of the substrate or on the substrate top side of the substrate, at least one electrical connection of the monolithically integrated electrical component is connected by means of a connection line to a conductor track connection situated below the substrate rear side, wherein the connection line extends through a (dedicated) through hole in the substrate from the electro-optical component to the conductor track connection situated below the substrate rear side, and the chip is placed by its underside on a printed circuit board that forms a wiring plane for the electrical conductor track connections situated on the substrate rear side. The printed circuit board preferably has at least one connection line which electrically interconnects the conductor track connection connected to the electrical component and the conductor track connection connected to the electro-optical component.

An optoelectronic component comprising a chip comprising a substrate and at least one optical waveguide integrated in the chip is additionally regarded as an invention, wherein it is provided that an electrical component is monolithically integrated in one or a plurality of semiconductor layers of the chip arranged on the substrate top side of the substrate, or on the substrate top side of the substrate and at least one electrical connection of the monolithically integrated electrical component is connected by means of a connection line to a conductor track connection situated below the substrate rear side, wherein the connection line extends through a through hole in the substrate from the electrical component to the conductor track connection situated below the substrate rear side.

Preferably, an electro-optical component is additionally monolithically integrated in one or a plurality of semiconductor layers of the chip arranged on the substrate top side of the substrate or on the substrate top side of the substrate. The electro-optical component and the electrical component are preferably connected by means of a line that is arranged on the substrate top side of the substrate.

The invention is explained in greater detail below on the basis of exemplary embodiments with reference to FIGS. 1 to 17.

FIG. 1 shows in cross section one exemplary embodiment of an optoelectronic component 100 comprising a chip 110, preferably in the form of an SOT chip. The chip 110 comprises a substrate 12 in the form of a silicon substrate, a buried silicon dioxide layer 11 situated on the top side 12a of the substrate 12, a silicon layer 10a situated on the silicon dioxide layer 11, and a material layer assembly 10 situated on the silicon layer 10a. The material layer assembly 10 forms in the jargon the so-called "backend of line" region of the chip 110.

An optical waveguide 20 is integrated in the chip 110, said optical waveguide preferably being a ridge waveguide embodied in the silicon layer 10a. In addition, an electro-optical component 30 is monolithically integrated in the chip 110, preferably in the silicon layer 10a. The electro-optical component 30 is connected by means of a connection line 41 to a conductor track connection 43 situated below the substrate rear side 12b. The connection line 41 extends through a through hole 42 in the substrate 12 from the electro-optical component 30 to the conductor track connection 43 situated below the substrate rear side 12b.

The connection line 41 can, in sections, bear on the chip top side of the chip 110 or—as shown in FIG. 1—be integrated within the material layer assembly 10. In both cases, a section of the connection line 41 preferably extends through a hole 40 in the material layer assembly 10 or in the "backend of line" region of the chip 110 or through a hole 40 in one or more layers of said material layer assembly 10 in the direction of the chip top side of the chip 110.

FIG. 2 shows the optoelectronic component 100 in accordance with FIG. 1 in plan view.

FIG. 3 shows in plan view a further exemplary embodiment of an optoelectronic component 100 comprising a chip 110 in the form of an SOI chip. An optical waveguide 20, a grating coupler 21 and also an electrical component in the form of control electronics 50 are monolithically integrated into the silicon layer 10a (see FIG. 1) of the chip 110 that is situated on the buried silicon dioxide layer 11 (see FIG. 1). For the rest, the above explanations in association with FIGS. 1 and 2 are correspondingly applicable.

Further preferred exemplary embodiments of optoelectronic components are shown in FIGS. 4 to 13.

FIG. 4 shows in cross section one exemplary embodiment of an optoelectronic component 100 which is positioned with further components on a wiring substrate 61 and is sealed with potting material 60. The wiring substrate 61 is connected to the carrier substrate 62 via connections for electrical contacting 65. Alongside the optoelectronic component 100, one or a plurality of electronic chips 63 are situated on the wiring substrate 61, said electronic chips being connected to the wiring substrate 61 via electrical contactings 64.

Situated on the top side of the chip 110 in the "backend of line" region 10 is one or a plurality of monolithically integrated lenses 23 for the optical coupling of the emerging optical radiation LOR of one or a plurality of lasers 70 situated on the optoelectronic component 100, said lasers being connected via electrical contactings 45 to the through holes 42 in the chip 110.

One or a plurality of optical fibers 80 are connected to plugs 81 fitted on the optoelectronic component 100, said plugs containing deflection optical units 82, in a manner such that the optical fiber or fibers 80 run(s) parallel to the chip top side 110. The optical radiation FCR deflected by the deflection optical units 2 is coupled to one or a plurality of waveguides 20 via deflection units such as e.g. grating couplers 21 and is processed e.g. in a monolithically integrated electro-optical component 30.

FIG. 5 shows in cross section one exemplary embodiment of an optoelectronic component 100 in which one or a plurality of lasers 70 are situated alongside the optoelectronic component 100 on the wiring substrate 61 and the emerging optical radiation LOR is coupled through a lens 24 in or on one or a plurality of lasers 70 and through the adjacent end facet of one or a plurality of waveguides 20 into the chip 110 and is processed e.g. in a monolithically integrated electro-optical component 30.

Figure 2:
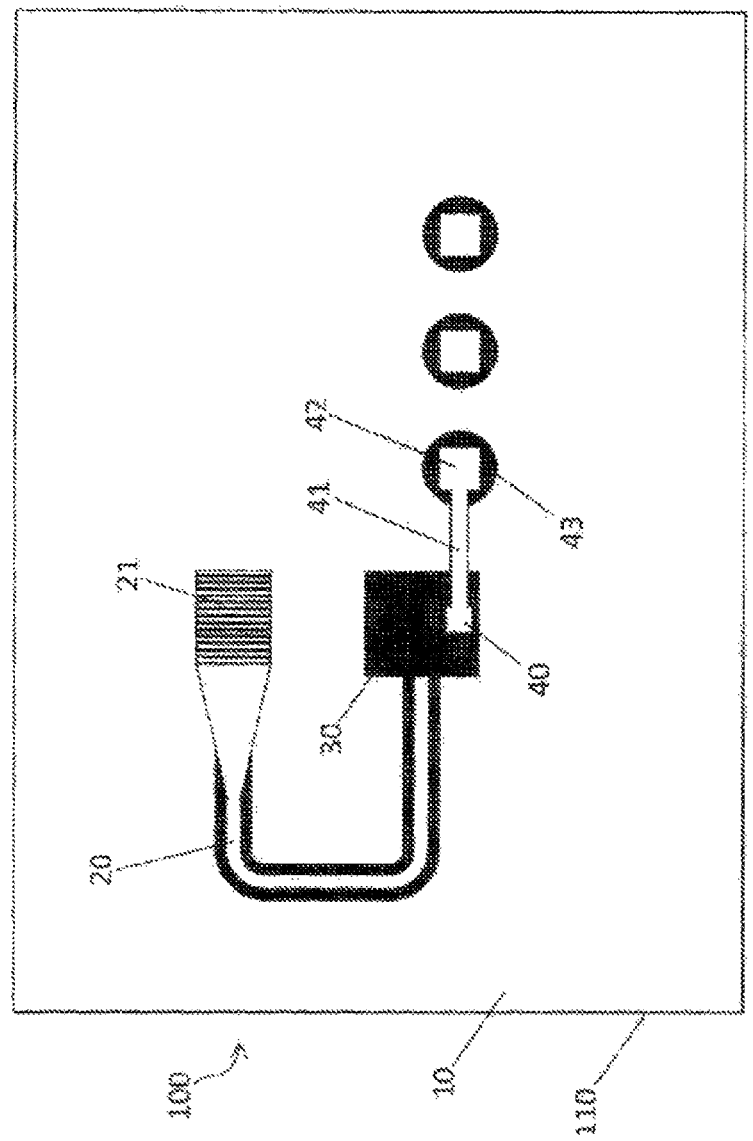
Figure 3:
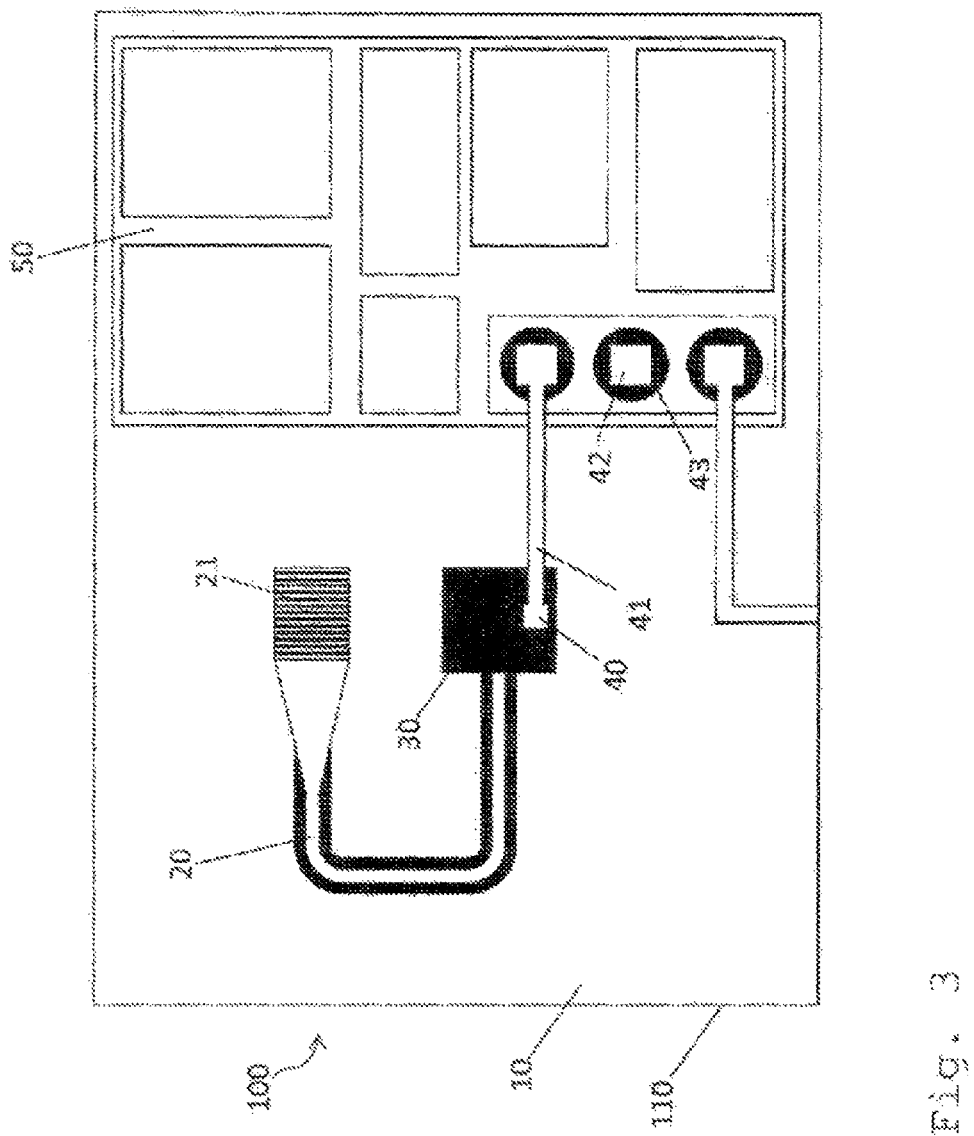
Figure 4:
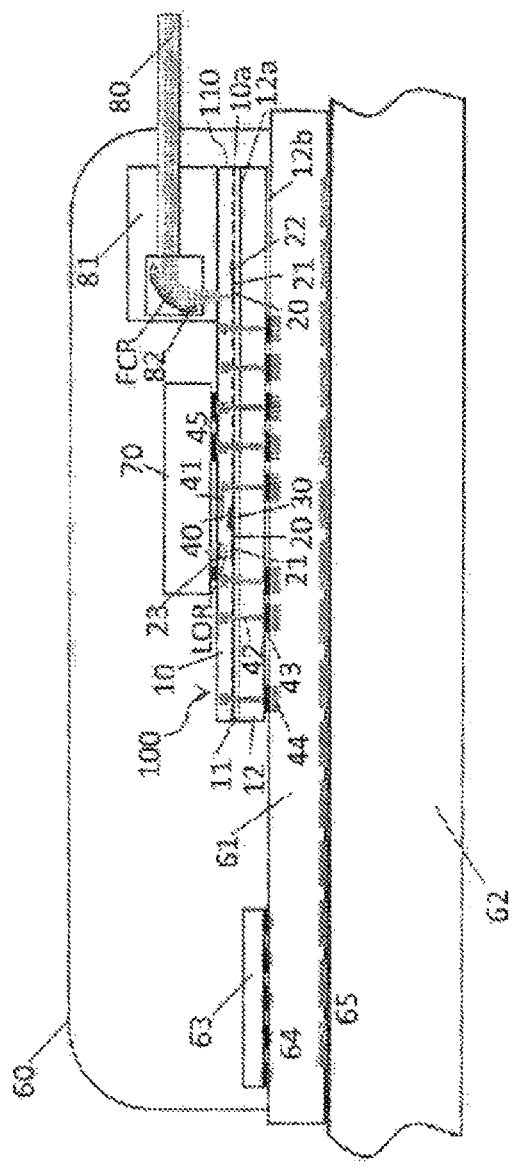
Figure 5:
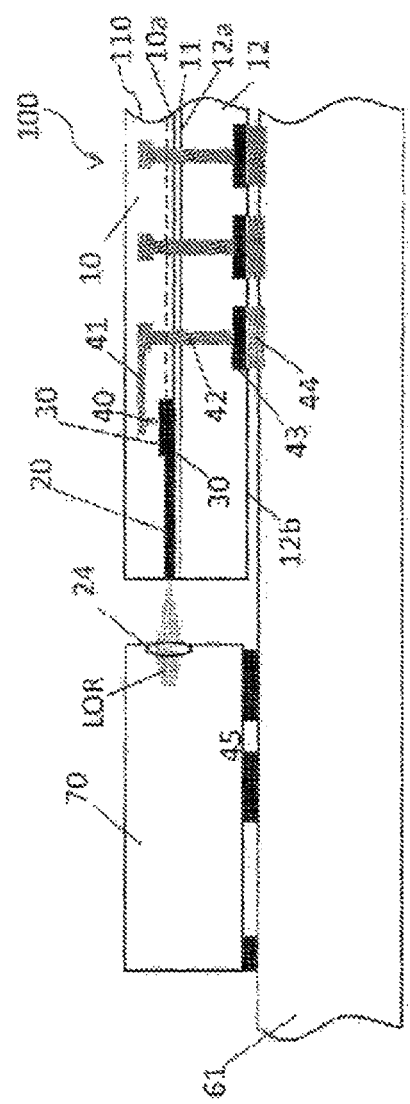
Figure 6:
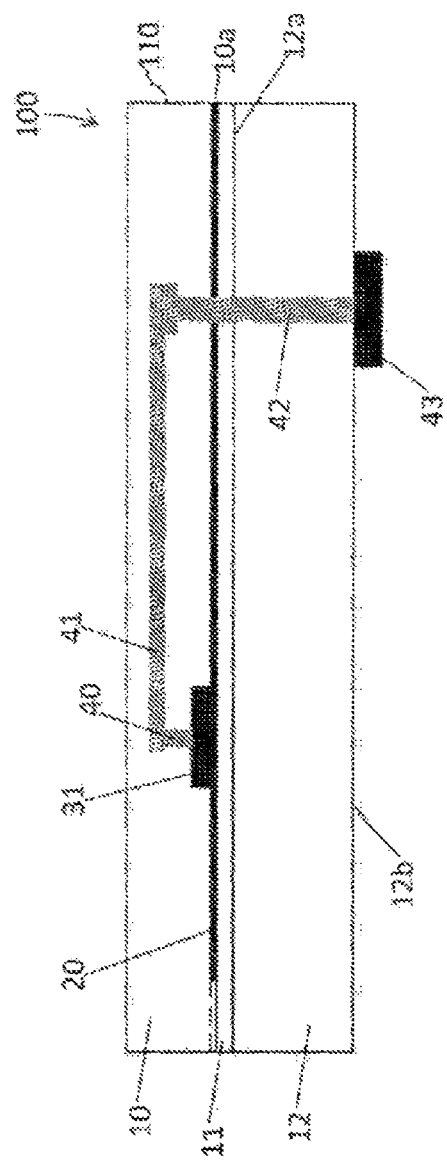
FIG. 6 shows in cross section one exemplary embodiment of an optoelectronic component 100 in which the monolithically integrated electro-optical component is a modulator 31.
Figure 7:
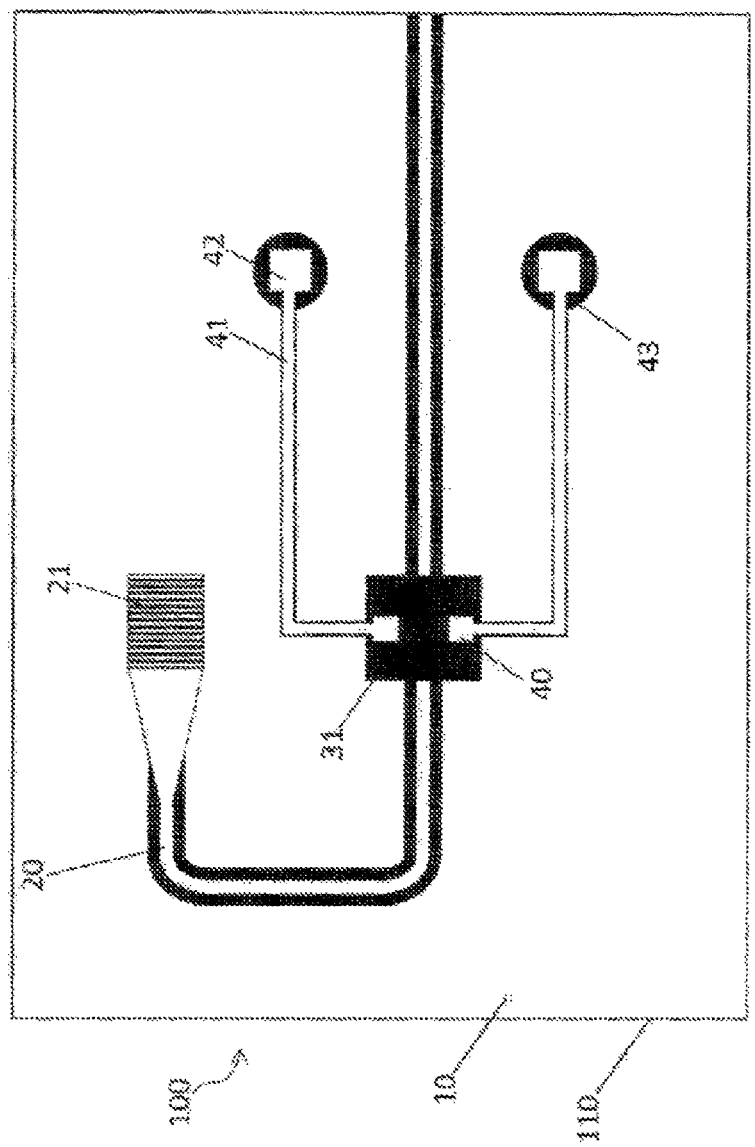
FIG. 7 shows the optoelectronic component 100 in accordance with FIG. 6 in plan view.
Figure 8:
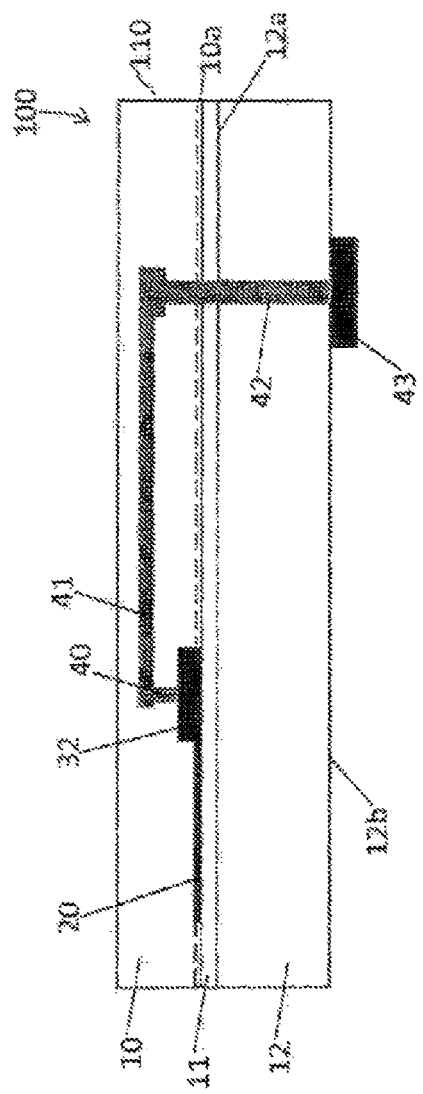
FIG. 8 shows in cross section one exemplary embodiment of an optoelectronic component 100 in which the monolithically integrated electro-optical component is a photodetector 32.
Figure 9:
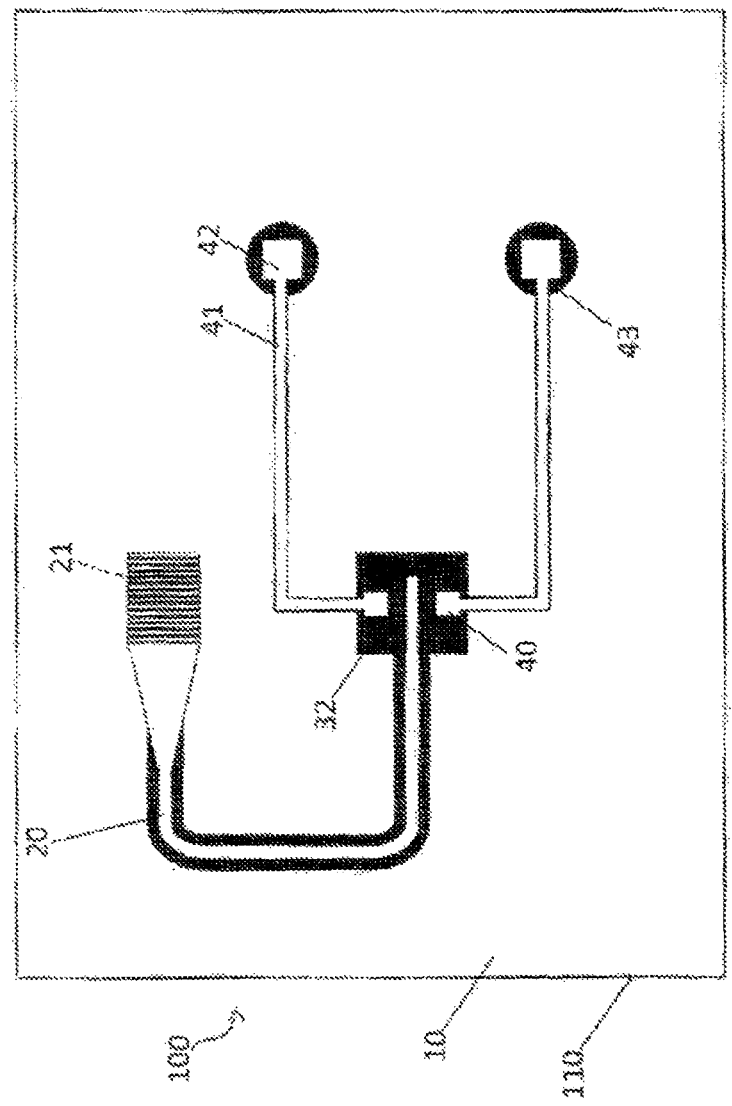
FIG. 9 shows the optoelectronic component 100 in accordance with FIG. 8 in plan view.
Figure 10:
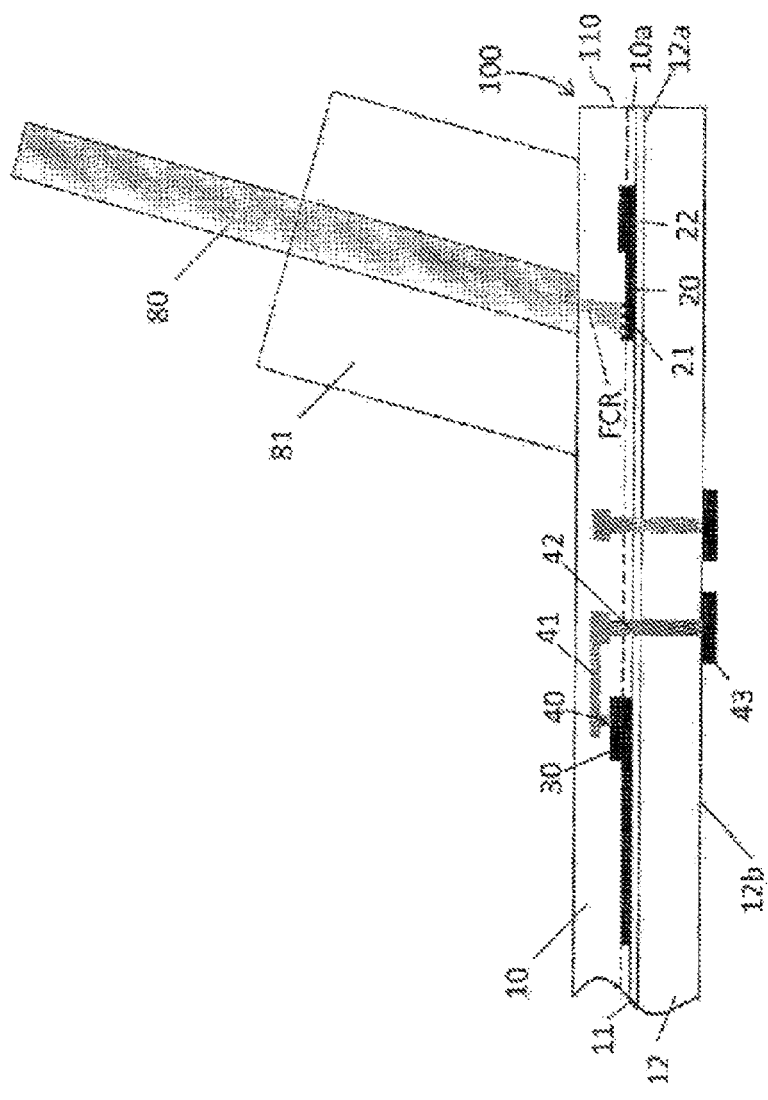

FIG. 10 shows in cross section one exemplary embodiment of an optoelectronic component 100 in which one or a plurality of optical fibers 80 are connected to plugs 81 fitted on the optoelectronic component 100 in a manner such that the optical fiber or fibers 80 point(s) virtually perpendicularly in the direction of the chip top side 110. The optical radiation FCR is coupled to one or a plurality of waveguides 20 via deflection units such as e.g. grating couplers 21 and is processed e.g. in a passive photonic component 22.

Figure 11:
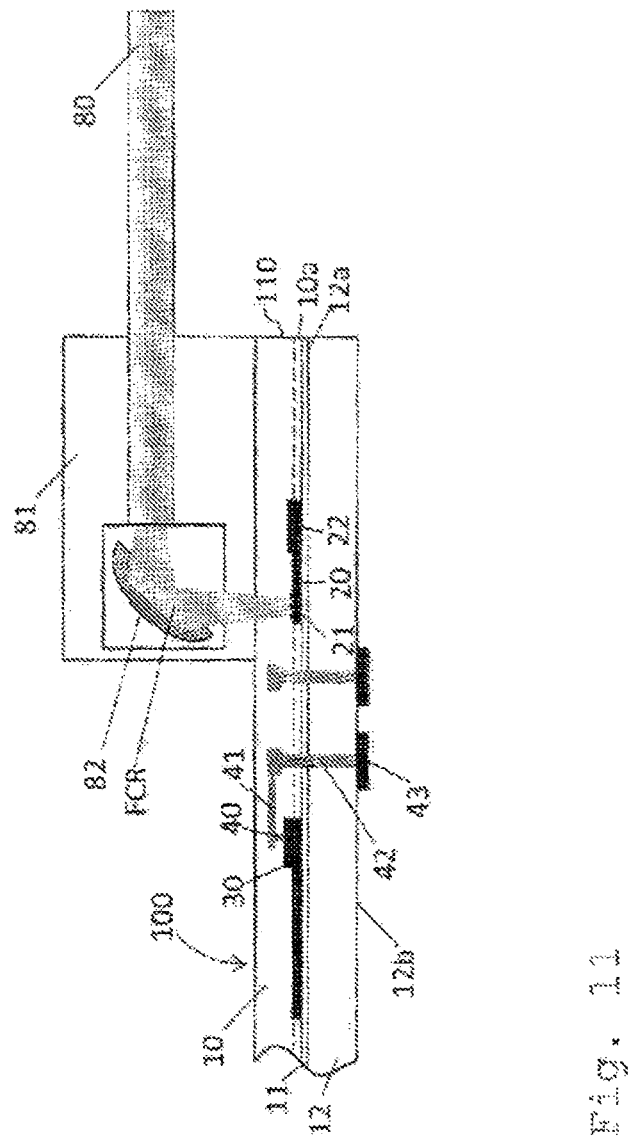

FIG. 11 shows in cross section one exemplary embodiment of an optoelectronic component 100 in which one or a plurality of optical fibers 80 are connected to plugs 81 fitted on the optoelectronic component 100, said plugs containing deflection optical units 82, in a manner such that the optical fiber or fibers 80 run(s) parallel to the chip top side 110. The optical radiation FCR deflected by the deflection optical units 2 is coupled to one or a plurality of waveguides 20 via deflection units such as e.g. grating couplers 21 and is processed e.g. in a passive photonic component 22.

Figure 12:
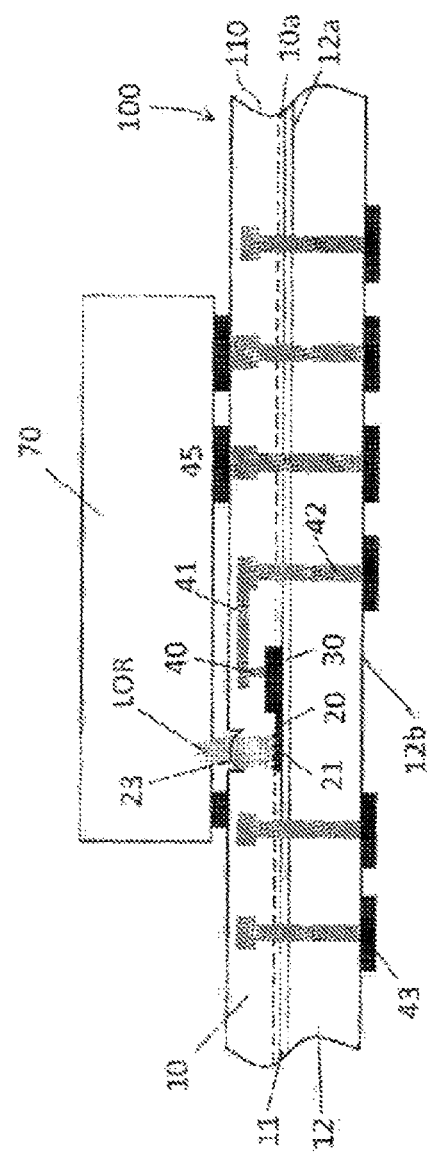

FIG. 12 shows in cross section one exemplary embodiment of an optoelectronic component 100 in which one or a plurality of monolithically integrated lenses 23 are situated on the top side of the chip 110 in the "backend of line" region 10, said lenses serving for the optical coupling of the emerging optical radiation LOR of one or a plurality of lasers 70 situated on the optoelectronic component 100, said lasers being connected via electrical contactings 45 to the through holes 42 in the chip 110. The optical radiation LOR emerging from the underside of the laser or lasers 70 is coupled to one or a plurality of waveguides 20 via deflection units such as e.g. grating couplers 21 and is processed e.g. in a monolithically integrated electro-optical component 30.

Figure 13:
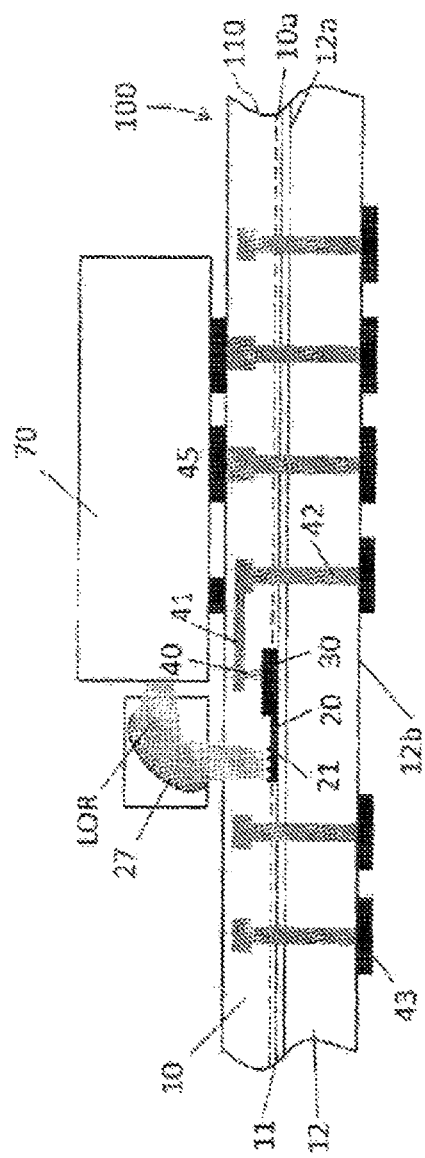
Figure 1A:
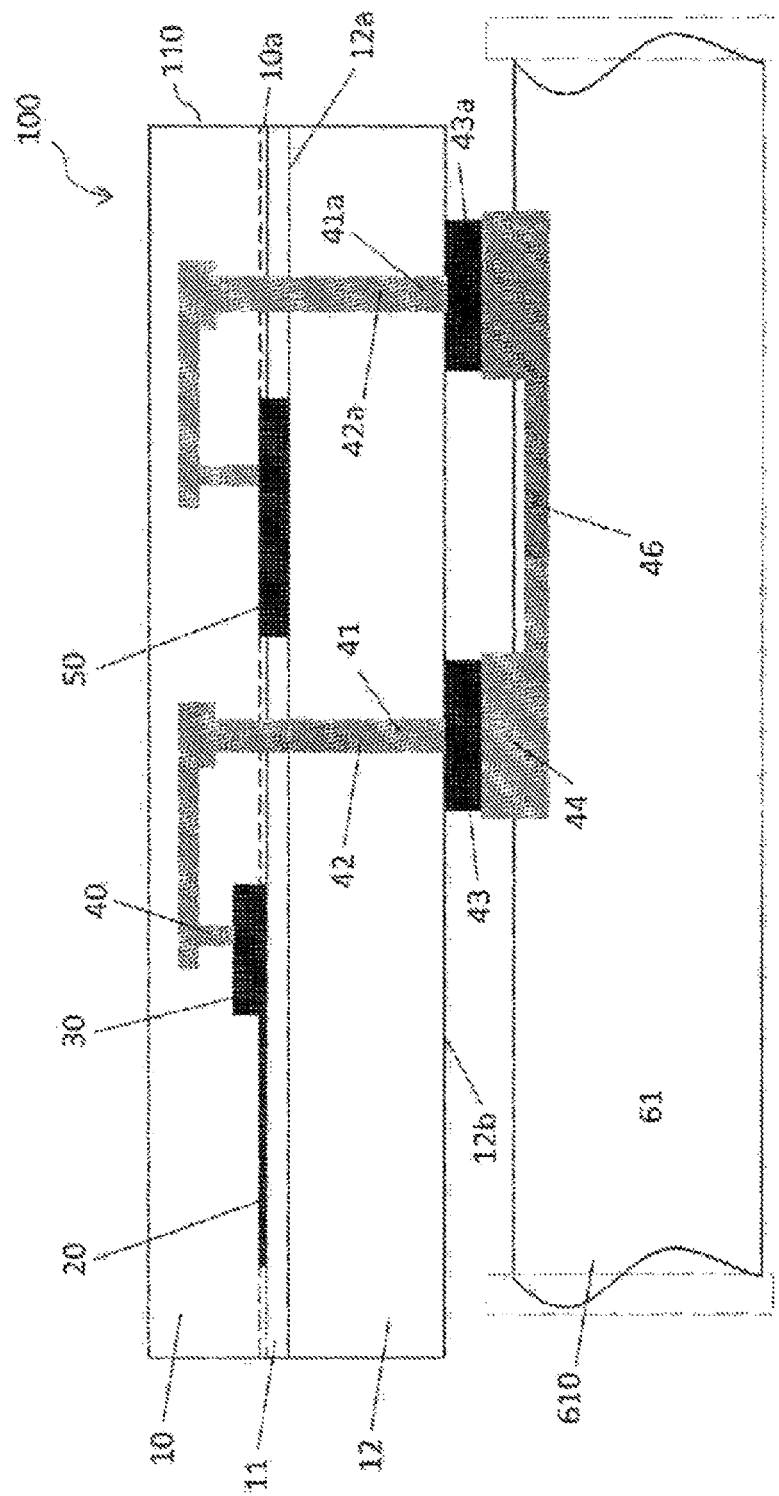

FIG. 13 shows in cross section one exemplary embodiment of an optoelectronic component 100 in which one or a plurality of lasers 70 are situated on the optoelectronic component 100, said lasers being connected via electrical contactings 45 to the through holes 42 in the chip 110. The optical radiation LOR emerging laterally from the laser or lasers 70 is guided by a beam deflection 27 in deflection units such as e.g. grating couplers 21 and is coupled to one or a plurality of waveguides 20 and is processed e.g. in a monolithically integrated electro-optical component 30.

FIG. 14 shows a further exemplary embodiment of an optoelectronic component 100 according to the invention. The component 100 comprises a chip 110 comprising a substrate 12 and at least one optical waveguide 20 integrated in the chip 110.

An electro-optical component 30 is monolithically integrated in one or a plurality of semiconductor layers of the chip 110 arranged on the substrate top side 12a of the substrate 12, or on the substrate top side 12a of the substrate 12.

At least one electrical connection of the monolithically integrated electro-optical component 30 is connected by means of a connection line 41 to a conductor track connection 43 situated below the substrate rear side 12b.

The connection line 41 extends through a through hole 42 in the substrate 12 from the electro-optical component 30 to the conductor track connection 43 situated below the substrate rear side 12b.

In addition, an electrical component 50 is monolithically integrated in one or a plurality of semiconductor layers of the chip 110 arranged on the substrate top side 12a of the substrate 12, or on the substrate top side 12a of the substrate 12.

At least one electrical connection of the monolithically integrated electrical component 50 is connected by means of a connection line 41a to a conductor track connection 43a situated below the substrate rear side 12b.

The connection line 41a extends through a through hole 42a in the substrate 12 from the electrical component 50 to the conductor track connection 43a situated below the substrate rear side 12b.

The chip 110 is placed by its underside on a printed circuit board 610 that forms a wiring plane for the electrical conductor track connections 43 and 43a situated on the chip rear side or the substrate rear side 12b. The printed circuit board 610 comprises at least one connection line 46 which electrically interconnects the conductor track connection 43a connected to the electrical component 50 and the conductor track connection 43 connected to the electro-optical component 30.

Figure 15:
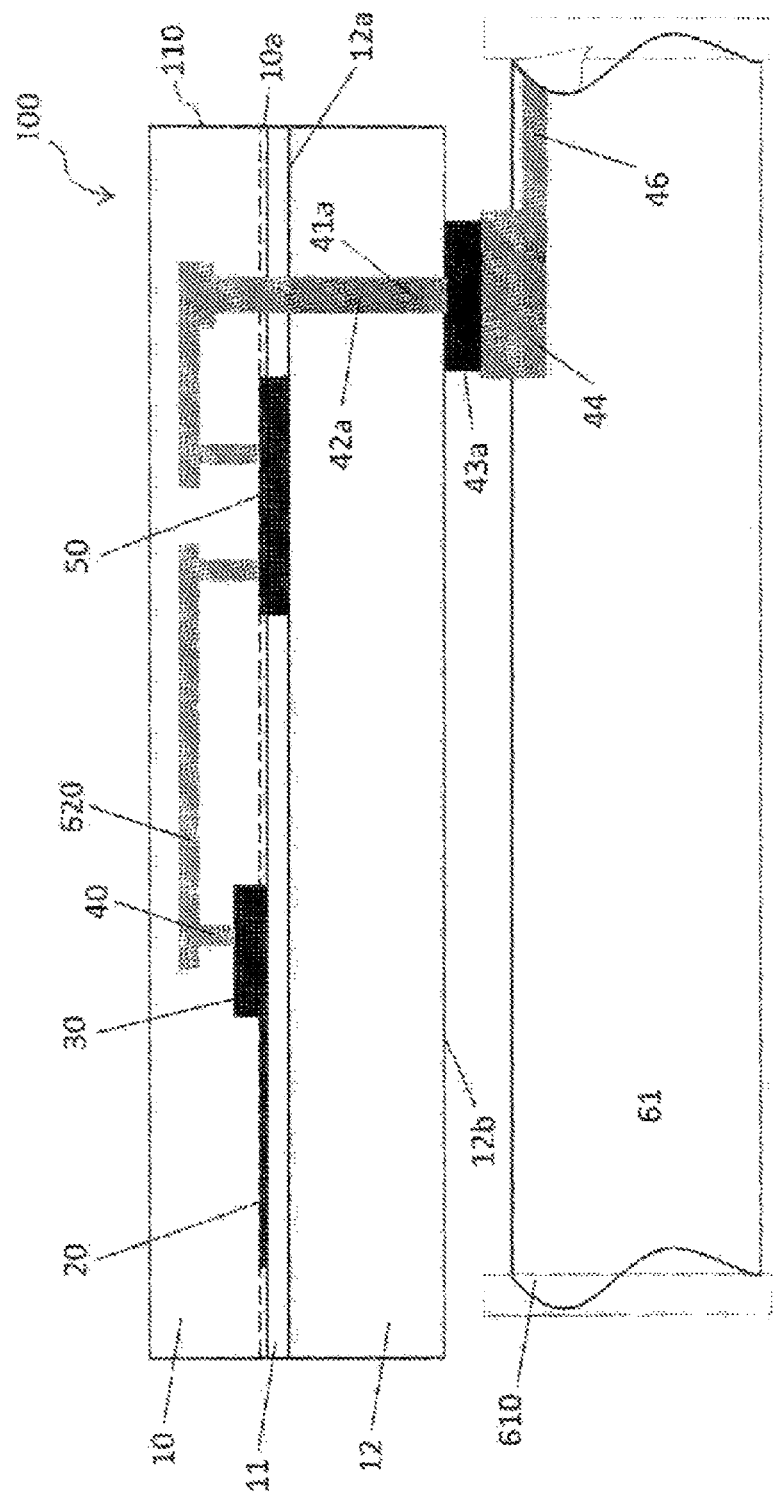

FIG. 15 shows a further exemplary embodiment of an optoelectronic component 100 according to the invention. The component 100 comprises a chip 110 comprising a substrate 12 and at least one optical waveguide 20 integrated in the chip 110.

An electro-optical component 30 and an electrical component 50 are monolithically integrated in one or a plurality of semiconductor layers of the chip 110 arranged on the substrate top side 12a of the substrate 12, or on the substrate top side 12a of the substrate 12.

At least one electrical connection of the monolithically integrated electrical component 50 is connected by means of a connection line 41a to a conductor track connection 43a situated below the substrate rear side 12b.

The connection line 41a extends through a through hole 42a in the substrate 12 from the electrical component 50 to the conductor track connection 43a situated below the substrate rear side 12b.

The chip 110 is placed by its underside on a printed circuit board 610 that forms a wiring plane for the electrical conductor track connection 43a situated on the chip rear side or the substrate rear side 12b.

The printed circuit board 610 comprises at least one connection line 46 which connects the conductor track connection 43a connected to the electrical component 50 to another component (not shown in FIG. 15 for reasons of clarity).

The electro-optical component 30 and the electrical component 50 are connected by means of at least one line 620 which is arranged on the substrate top side 12a of the substrate 12.

In the exemplary embodiments in accordance with FIGS. 14 and 15, the electrical component 50 is in each case directly on the substrate 12 and terminates (upward) in each case in terms of height with the waveguides 20 in the silicon layer 10a. In other words, the electrical component 50 extends in each case from the substrate 12 right into the silicon layer 10a situated on the silicon dioxide layer.

Figure 16:
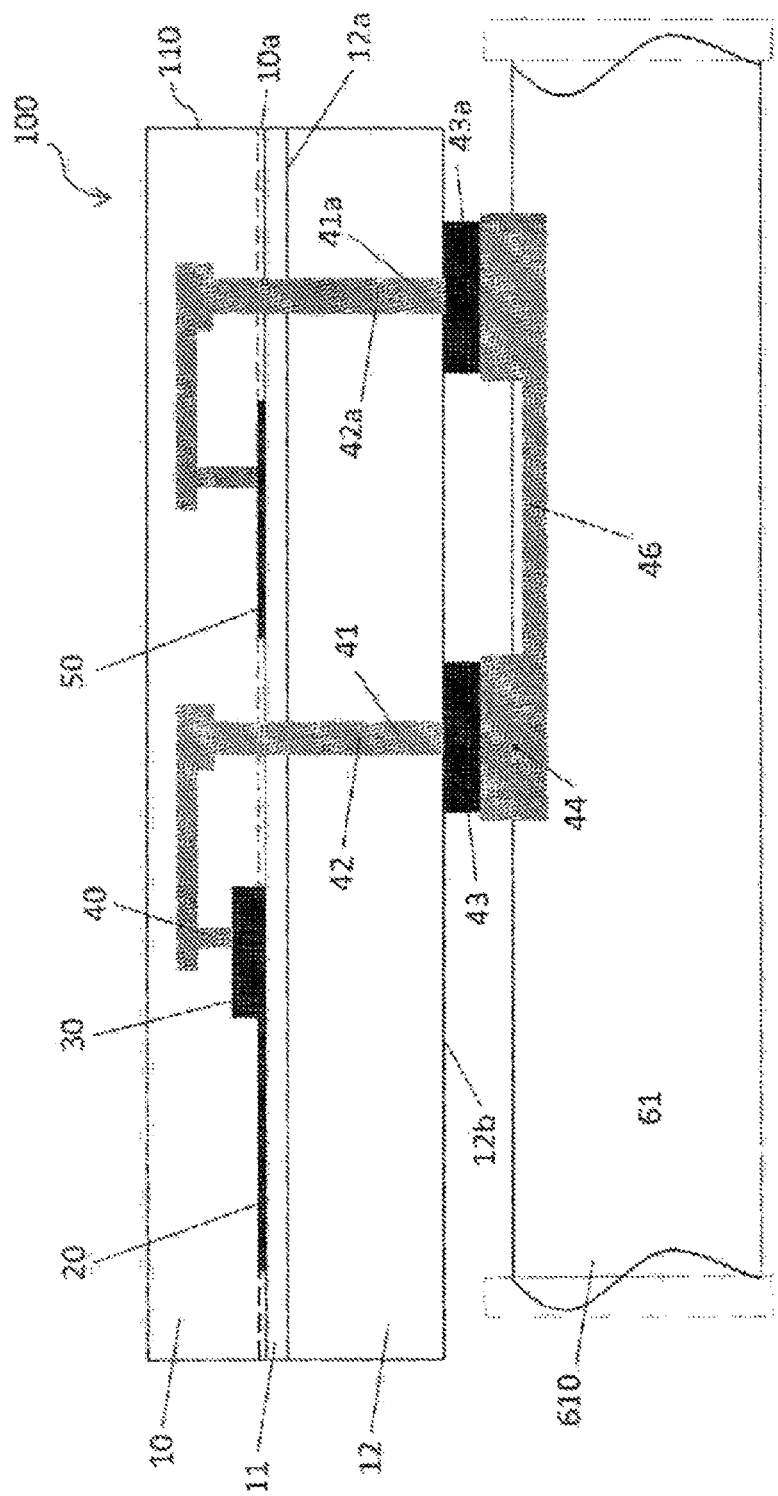
Figure 17:
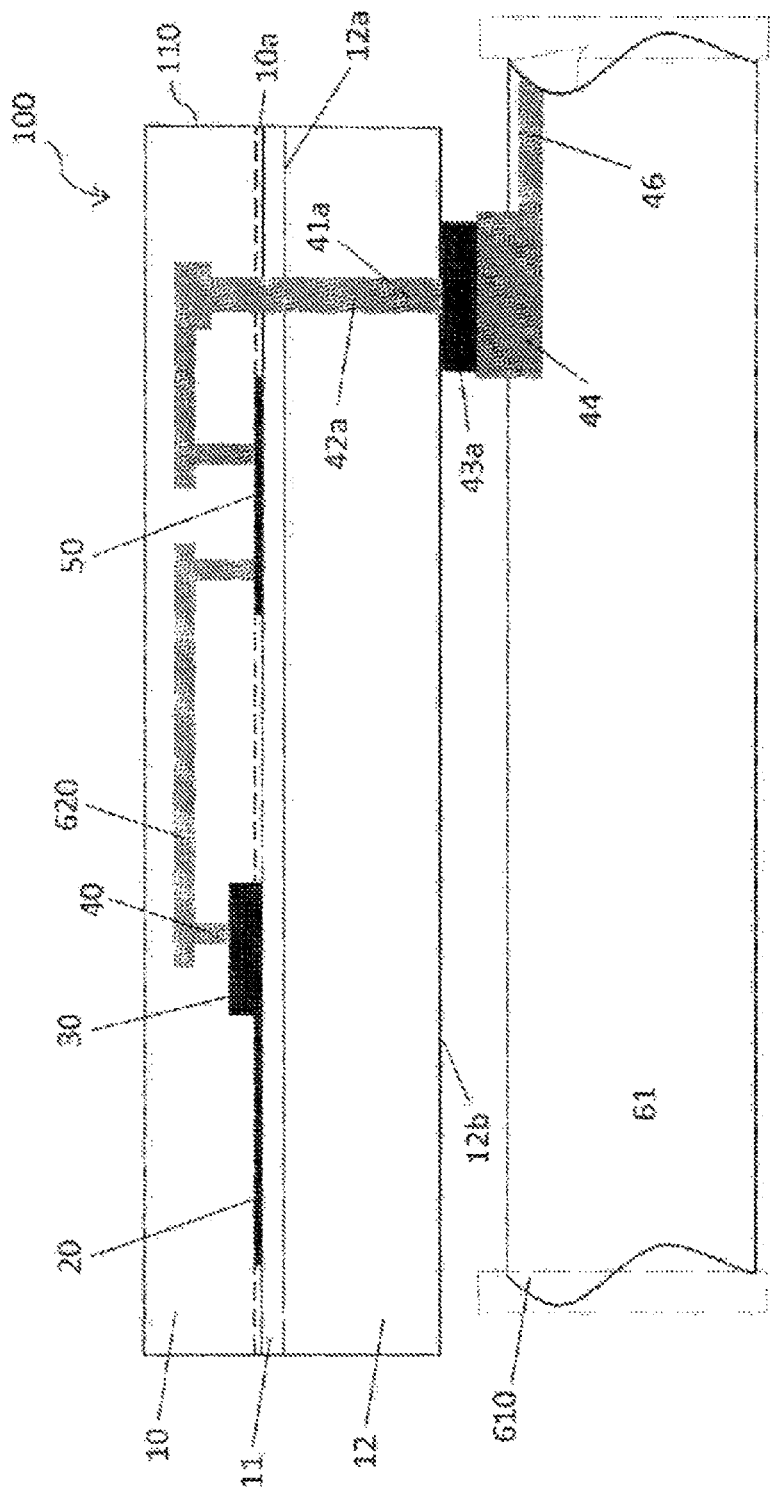

FIGS. 16 and 17 show further exemplary embodiments of an optoelectronic component 100 with an electrical component 50 arranged exclusively in the silicon layer 10a.

The exemplary embodiments in accordance with FIGS. 16 and 17 respectively correspond to the exemplary embodiments in accordance with FIGS. 14 and 15 apart from the configuration of the electrical component 50. In the exemplary embodiments in accordance with FIGS. 16 and 17, the electrical component 50 is arranged in each case exclusively in the silicon layer 10a; for the rest, the explanations in association with the exemplary embodiments in accordance with FIGS. 14 and are correspondingly applicable for the exemplary embodiments in accordance with FIGS. 16 and 17.

Although the invention has been more specifically illustrated and described in detail by means of preferred exemplary embodiments, nevertheless the invention is not restricted by the examples disclosed and other variations can be derived therefrom by the person skilled in the art, without departing from the scope of protection of the invention.

LITERATURE

[1] H. Schröder, T. Bierhoff and D. Craiovan, "Anforderungen und Lösungen zur hochpräzisen optoelektronischen und mikrooptischen Montage auf Baugruppenträgern," Cooperative Computing & Communication Laboratory, C-Lab Report 9, 6, 2010.
[2] F. E. Doany, B. G. Lee, C. L. Schow, C. K. Tsang, C. Baks, Y. Kwark, R. John, J. J. Knickerbocker and J. A. Kash, "Terabit/s-class 24-channel bidirectional optical transceiver module based on TSV Si carrier for board-level interconnects," in ECTC, Electronic Components and Technology Conference, Piscataway, N.J.: IEEE, 2010, pages 58-65.
[3] P. de Dobbelaere, G. Young and M. Peterson, "Method And System For A Photonic Interposer", USA 13/422, 776, Jul. 12, 2012.

REFERENCE SIGNS

10 Material layer assembly
10a Silicon layer
11 Silicon dioxide layer
12 Substrate
12a Top side of the substrate
12b Substrate rear side
20 Optical waveguide
21 Grating coupler
22 Passive photonic component
23 Monolithically integrated lens in the "backend of line" region
24 Lens in or on a laser
27 Beam deflection
30 Monolithically integrated electro-optical component
31 Monolithically integrated electro-optical modulator
32 Monolithically integrated photodiode/photodetector
40 Hole
41 Connection line
41a Connection line
42 Through hole
42a Through hole
43 Conductor track connection
43a Conductor track connection
44 Connection for electrical contacting on a wiring substrate
45 Connection for electrical contacting of a laser chip
46 Connection line
50 Monolithically integrated control electronics (cointegration)
60 Potting material
61 Wiring substrate
62 Carrier substrate (e.g. printed circuit board (PCB))
63 Electronic chip
64 Connection for the electrical contacting of an electronic chip with the wiring substrate
65 Connection for the electrical contacting of the wiring substrate with the carrier substrate
70 Laser
80 Fiber
81 Fiber plug
82 Deflection optical unit in the fiber plug
100 Optoelectronic component
110 Chip
610 Printed circuit board
620 Line

The invention claimed is:

1. An optoelectronic component (100) comprising a chip (110)
   comprising a substrate (12) and
   at least one optical waveguide (20) integrated in the chip (110), characterized in that
   an electro-optical component (30) is monolithically integrated in one or a plurality of semiconductor layers of the chip (110) arranged on the substrate top side (12a) of the substrate (12), or on the substrate top side (12a) of the substrate (12) and
   at least one electrical connection of the monolithically integrated electro-optical component (30) is connected by means of a connection line (41) to a conductor track connection (43) situated below the substrate rear side (12b),
   wherein the connection line (41) extends through a through hole (42) in the substrate (12) from the electro-optical component (30) to the conductor track connection (43) situated below the substrate rear side (12b),
   wherein an electrical component (50) is monolithically integrated in one or a plurality of semiconductor layers of the chip (110) arranged on the substrate top side (12a) of the substrate (12) or on the substrate top side (12a) of the substrate (12),
   wherein at least one electrical connection of the monolithically integrated electrical component (50) is connected by means of a connection line (41a) to a conductor track connection (43a) situated below the substrate rear side (12b), wherein the connection line (41a) extends through a through hole (42) in the substrate (12) from the electro-optical component (30)

to the conductor track connection (43) situated below the substrate rear side (12b), wherein the chip (110) is placed by its underside on a printed circuit board (610) that forms a wiring plane for the electrical conductor track connections (43, 43a) situated on the substrate rear side (12b), and wherein the printed circuit board (610) has at least one connection line (46) which electrically interconnects the conductor track connection (43b) connected to the electrical component (50) and the conductor track connection (43) connected to the electro-optical component (30).

2. The optoelectronic component (100) as claimed in claim 1, characterized in that at least one of the optical connections, preferably all of the optical connections, are arranged on the chip top side of the chip (110) and at least one of the electrical connections, preferably all of the electrical connections, are arranged on the chip underside of the chip (110).

3. The optoelectronic component (100) as claimed in claim 1, characterized in that the monolithically integrated electro-optical component (30) is a photodetector (32) or a modulator (31).

4. The optoelectronic component (100) as claimed in claim 1, characterized in that the integrated waveguide (20) is equipped with or connected to a deflection device which deflects optical radiation to be coupled out from the waveguide (20) virtually perpendicularly in the direction of the chip top side, or deflects radiation incident virtually perpendicularly from the chip top side and couples it into the waveguide (20).

5. The optoelectronic component (100) as claimed in claim 4, characterized in that the deflection device is formed by a grating coupler (21) embodied in the waveguide (20).

6. The optoelectronic component (100) as claimed in claim 1, characterized in that a silicon dioxide layer is situated on the substrate (12) and a silicon layer (10a) is situated above said silicon dioxide layer, and the optical waveguide (20) and the electro-optical component (30) are monolithically integrated in the silicon layer (10a).

7. The optoelectronic component (100) as claimed in claim 1, characterized in that the monolithically integrated electrical component (50) is an amplifier or a driver.

8. The optoelectronic component (100) as claimed in claim 1, characterized in that the at least one integrated waveguide (20) or at least one of the integrated waveguides (20)

in the region of one of its waveguide ends is equipped with or connected to a deflection device by which optical radiation that comes from a light source arranged on the chip top side of the chip (110) and is incident virtually perpendicularly to the chip top side is coupled into the waveguide (20), and in the region of the other waveguide end is equipped with or connected to a deflection device which deflects optical radiation to be coupled out from the waveguide (20) virtually perpendicularly in the direction of the chip top side, in particular in the direction of an optical fiber arranged on the chip top side or in the direction of a light deflection element arranged on the chip top side, wherein at least one electrical connection of the light source is connected by means of a connection line (41) to a conductor track connection (43) situated below the substrate rear side (12b).

9. The optoelectronic component (100) as claimed in claim 8, characterized in that a modulator is monolithically integrated between the two waveguide ends in the chip (110), said modulator modulating the radiation of the light source before coupling into the optical fiber.

10. The optoelectronic component (100) as claimed in claim 1, characterized in that the at least one integrated waveguide (20) or at least one of the integrated waveguides (20)

in the region of one of its waveguide ends is equipped with or connected to a deflection device by which optical radiation that comes from an optical fiber arranged on the chip top side and is incident virtually perpendicularly to the chip top side is coupled into the waveguide (20), and in the region of the other waveguide end is connected to a photodetector (32) integrated in the chip (110).

11. The optoelectronic component (100) as claimed in claim 10, characterized in that a transimpedance amplifier is monolithically integrated in the chip (110), said transimpedance amplifier amplifying the electrical signal of the photodetector (32).

12. The optoelectronic component (100) as claimed in claim 1, characterized in that the chip (110) is placed by its underside on a printed circuit board that forms a wiring plane for the electrical conductor track connection (43) situated on the chip rear side.

13. The optoelectronic component (100) as claimed in claim 1, wherein the electro-optical component (30) and the electrical component (50) are connected by means of a line (620) that is arranged on the substrate top side (12a) of the substrate (12).

* * * * *